Oct. 29, 1946. A. LYSHOLM 2,410,172
ROTARY SCREW WHEEL APPARATUS
Filed May 31, 1941 3 Sheets-Sheet 3

INVENTOR
Alf Lysholm
BY
Jarvis C. Marble
His ATTORNEY

Patented Oct. 29, 1946

2,410,172

UNITED STATES PATENT OFFICE 2,410,172

ROTARY SCREW WHEEL APPARATUS

Alf Lysholm, Stockholm, Sweden, assignor, by mesne assignments, to Jarvis C. Marble, Leslie M. Merrill, and Percy H. Batten, as trustees Application May 31, 1941, Serial No. 396,030

10 Claims. (Cl. 230—143)

The present invention relates to apparatus of the rotary screw wheel type and has particular reference to compressors of this type as disclosed in my United States Patents No. 2,174,522 and No. 2,243,874 granted October 3, 1939 and June 3, 1941, respectively. More particularly my invention relates to compressors of the aforesaid type adapted to be constructed in large sizes for the compression of relatively large volumes of gaseous fluid.

Apparatus of the kind under consideration embodies working chambers defined by relatively moving rotor and casing parts which are out of contact with each other and the leakage from which is minimized by close clearances between the moving parts which may conveniently be referred to as "space packing." In order for such apparatus to operate with acceptable efficiency, the volume of fluid leaking from the working chambers through the space packing must be relatively small compared with the volume of fluid passing through the apparatus and this is essentially accomplished in the type of apparatus under consideration by operating the rotors at very high speeds, since the volume of fluid handled is substantially a direct function of the speed of operation while the volume of leakage through the space packing is relatively constant with respect to speed.

The very high rotor speeds required to secure a sufficiently low percentage of leakage from the working chambers result in relatively high velocities of fluid flow, which in turn involve dynamic losses.

I have discovered that a major factor producing such dynamic losses is the high speed of flow of the fluid along the length of the grooves which form the working spaces, as these spaces are filled during the inlet phase of the cycle of operation, this being particularly true when the apparatus operates as a compressor. This speed of fluid flow during the filling period may conveniently be referred to as piston speed since the moving fluid column is analogous to a piston.

Considerations such as required speed of operation for acceptable efficiency, proper relation of diameter to length of rotors and other practical design factors result in very high piston speeds in compressors of the kind under consideration when they are designed for large capacity, such for example as 10,000 cubic feet per minute, and in one of its aspects the invention has for an object the provision of improved structure capable of embodiment in units of large capacity for high speed operation, which at the same time will operate with piston speeds sufficiently low to avoid excessive dynamic losses due to this factor of operation.

I have further discovered that in the operation of high speed compressors of the kind with which the present invention is concerned, certain pressure variation or pressure wave phenomena occur in the field chambers both during the filling periods and during compression which can be made use of to increase the capacity and efficiency of operation of a compressor of given size, and in another of its aspects the present invention has for further objects the improvement of compressor performance through improved port arrangement and construction by means of which such phenomena may be turned to useful account.

The manner in which the above general object and other and more detailed objects which will hereinafter appear, are attained, may best be understood from a consideration of the ensuing portion of this specification, taken in conjunction with the accompanying drawings, in which by way of example but without limitation suitable apparatus for carrying the invention into effect is described and illustrated.

In the drawings:

Fig. 5 is a fragmentary view taken from the line 5—5 of Fig. 1;

Figure 1:
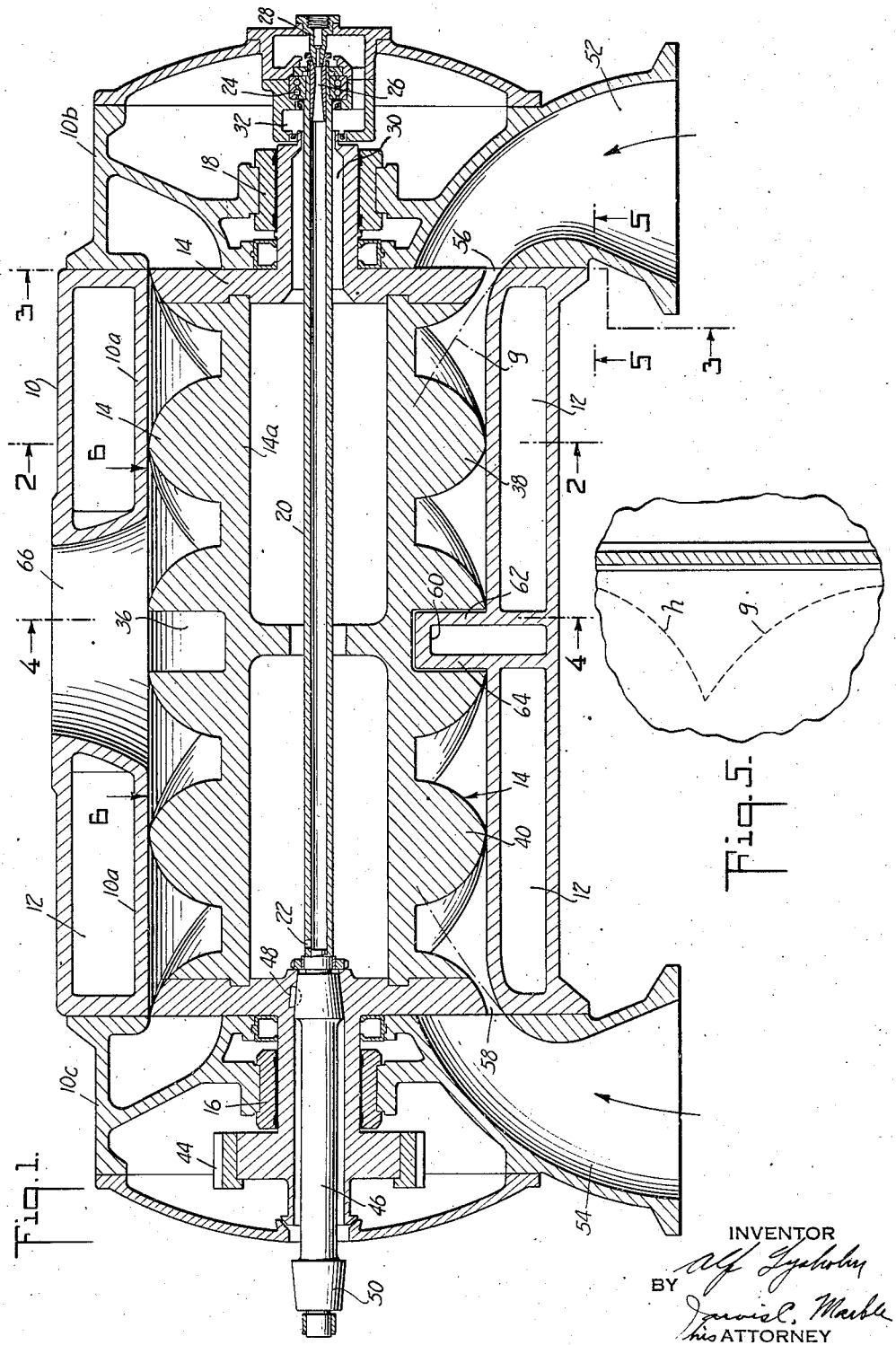
Fig. 1 is a longitudinal section of a compressor embodying the invention, taken on the line 1—1 of Fig. 4.

Referring now to the drawings, the compressor comprises a casing 10 consisting of a central barrel portion 10a and end closures 10b and 10c. In the embodiment illustrated, the central casing portion is shown with a jacket space 12 for cooling fluid. In the case of small compressors such jacketing may in some instances be omitted but ordinarily with large capacity compressors some form of cooling of the casing is desirable in order to prevent unequal expansion which adversely affects the maintenance of the desired close clearances.

The male rotor 14 is mounted for rotation in bearings 16 and 18 in the casing structure. For the same reasons that the casing is jacketed it is also desirable in the case of large units to cool the rotors and this is conveniently accomplished by circulating a cooling fluid through the central or core portions of the respective rotors. One suitable arrangement for accomplishing this is shown in Fig. 1 wherein the male rotor 14 is shown provided with a hollow core 14a. A hollow tube 20 is mounted at the axis of the rotor and is provided with one or more openings 22 adjacent to the end of the tube to provide communication between its interior and the hollow core space of the rotor surrounding the tube. One end of the tube 20 extends axially beyond the end of the rotor and is carried by a bearing 24 mounted in the casing structure. A Venturi tube 26 is provided at this latter end of the tube 20 and cooling fluid is supplied through the stationary nozzle 28 mounted in the casing structure. The injected cooling fluid travels through the hollow tube 20 and passes into the hollow rotor core through the ports 22, leaving the rotor through the annular channel 30 between the tube 20 and the end of the hollow core structure. Fluid discharged from the channel 30 passes to the chamber 32 from which it may flow to any suitable cooling device for cooling and return through nozzle 28. Obviously other specific means for circulating cooling fluid may be employed, but the above described means provides a simple and effective way of accomplishing the desired cooling of the moving rotor. It is to be noted that in effecting such cooling it is advantageous to have one end of the rotor free of other mechanism so as to permit the advantageous placing of the cooling connections at the axis of the rotor. It will be understood that where such cooling is employed a similar arrangement will be used for cooling the female rotor. The female rotor 34 is mounted in bearings similar to bearings 16 and 18 but not shown on the drawings, for rotation about an axis parallel to that of the male rotor.

Figure 2:
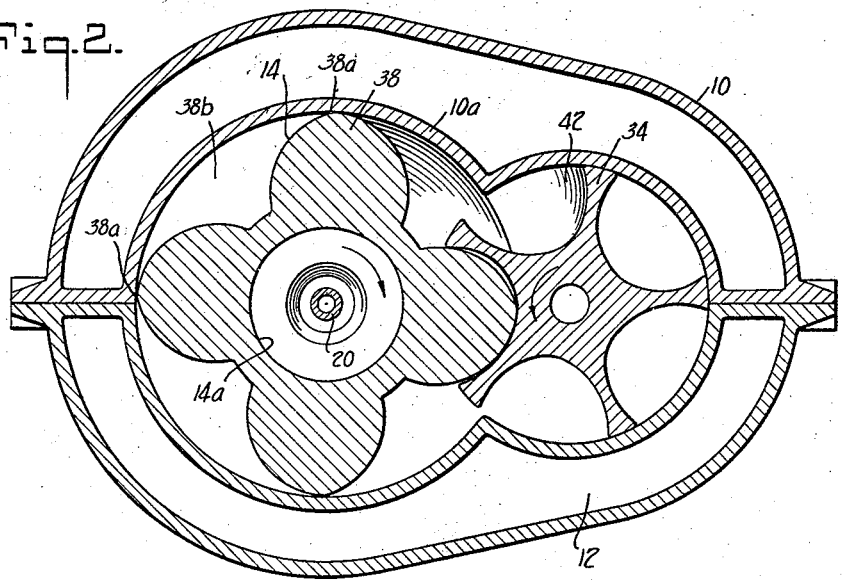
Fig. 2 is a section taken on the line 2—2 of Fig. 1.

The male rotor in the embodiment illustrated is provided with two sets of spiral lobes separated from each other at the center of the rotor by a space 36. One set of lobes 38, seen in Figs. 1 and 2, is inclined in one direction with respect to an axial plane while the other set of lobes 40, seen in Fig. 1, is inclined in the opposite direction, in the manner of the teeth of a herringbone gear. In the embodiment illustrated, each set of lobes on the male rotor comprises four lobes and the profiles of these lobes are preferably in accordance with the disclosure of my aforesaid Patent No. 2,174,522.

The female rotor is provided with two sets of grooves separated axially by a space 36, these grooves also being spiral and inclined so that the two sets cooperate in intermeshing relation with the lobes 38 and 40, respectively. In the embodiment illustrated the grooves, of which the set cooperating with the lobes 38 are shown at 42 in Fig. 2, are five in number in each set, the pitch of the grooves being different from that of the cooperating lobes in order to permit the four lobes of each set to properly intermesh with the five grooves of the cooperating set. The profile of the grooves is also preferably in accordance with the disclosure in my aforesaid Patent No. 2,174,522.

The cooperating rotors are synchronized or timed by suitable timing gears mounted on the rotor shafts, of which the gear for the male rotor is shown at 44 in Fig. 1.

As will be observed from Fig. 1, timing gear 44 is carried by a hollow sleeve-like extension of the rotor core which is carried in the bearing 16. Although it is not essential with respect to certain features of the invention, the power for driving the apparatus is preferably transmitted to the male rotor, for reasons which will hereinafter be more fully explained, and the power is preferably transmitted directly to the power receiving rotor through the shaft 46 which advantageously has some torsional and radial flexibility. This driving shaft, which is suitably keyed as at 48 to the rotor, extends through the sleeve carrying gear 44 to an outboard driving connection 50.

It will be noted that by means of this construction the timing gears are not in the path of power transmission from the source of power to the main body of the rotor and consequently the only torsional force tending to deflect the relatively small diameter journal part connecting the main body of the rotor with the timing gear is the torque transmitted through the timing gear in order to keep the rotors in properly synchronized relation.

The outer diameters of the rotors and the lobes thereon are made so that clearance is provided between the rotors and the inner surfaces of the casing which encloses them and also between the intermeshing portions of the rotors. This clearance is made as small as practical to provide what may be conveniently termed space packing for the compression spaces formed between the cooperating parts, and a primary function of the timing or synchronizing gears is to maintain the rotors in such properly timed relationship that clearance between them is maintained. Due to the space packing and resultant lack of rolling or sliding contact between the relatively moving rotor and casing parts, the rotors may be operated, and in accordance with the present invention are intended to be operated dry and at relatively very high speeds of rotation. When space packing is employed, high rotating speeds are required in order to obtain suitably high efficiency of operation.

When the rotor profiles are made in accordance with the preferred design disclosed in my aforesaid Patent No. 2,174,522, the torque transmitted through the timing gears is relatively only a small fraction of the total torque, amounting in most instances to not over about 15% of the latter. For reasons not germane to the present invention, the torque transmitted through the timing gears is negative rather than positive, when the input power is applied to the male rotor, since the fluid forces acting on the sides of the grooves and lobes when the compressor is in operation tend to make the female rotor rotate at a higher speed, or overrun, the male rotor. Since the driving torque is transmitted directly to the main body of the rotor in accordance with the present construction, it will be evident that the clearance between the rotors may be most effectively maintained since the parts connecting the rotors to effect synchronization therebetween are subject to very little torque and consequently are not subject to such torsional deflection as might permit the rotors to turn relative to each other to an extent destroying the clearance therebetween. The specific feature of construction just described forms the claimed subject matter of my copending divisional application Serial No. 479,429, filed March 17, 1943.

As will be noted from Fig. 2, the pitch lines of the rotors lie on the root circle of the male rotor and at the cylindrical envelope of the female rotor, respectively, or closely adjacent thereto; and as employed in this specification and the appended claims the terms male rotor and female rotor are intended to define rotors having this general characteristic with respect to their pitch circles as distinguished from rotors of the well known Roots or similar type which have their pitch lines located intermediate the apexes and roots of the lobes and which may be characterized generally as twin rotors.

Figure 3:
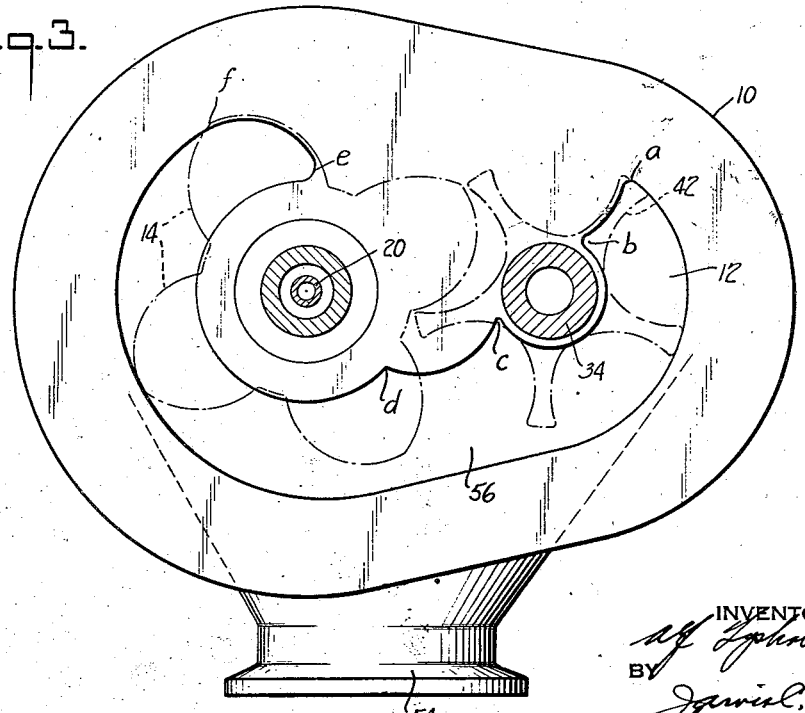
Fig. 3 is a section taken on the line 3—3 of Fig. 1.

Referring now more particularly to Fig. 1, 3, and 5, the casing ends are provided with inlet passages 52 and 54 which terminate in inlet ports 56 and 58, respectively, in the two end walls at the opposite ends of the rotors. These ports and their cooperating inlet passages are formed to provide for substantially axial admission of air to the ends of the grooves in the rotors as the latter pass these ports.

As will be seen more particularly from Fig. 3, the portion of the inlet port 56 for direct axial admission of fluid is defined by line $a$—$b$—$c$—$d$—$e$—$f$—$a$, the area of the port portion defined by this line in the end wall constituting the major area of the port. It is not essential, however, that this constitute the entire inlet port area and as will be seen from Fig. 1, it may be desirable in the interests of providing a smoothly curved inlet passage to have a small portion of the inlet port extend axially inwardly from the end wall. In the embodiment illustrated there is a small axially extending port portion defined by the lines $g$ and $h$ in Fig. 5, but it will be apparent from a consideration of Figs. 1, 3 and 5 that this relatively small port portion will not materially affect the general character of flow of the fluid into the apparatus, which flow can be said to be axial in nature.

It will be understood that the port 58 at the opposite end of the compressor will have the same outline as port 56.

Figure 4:
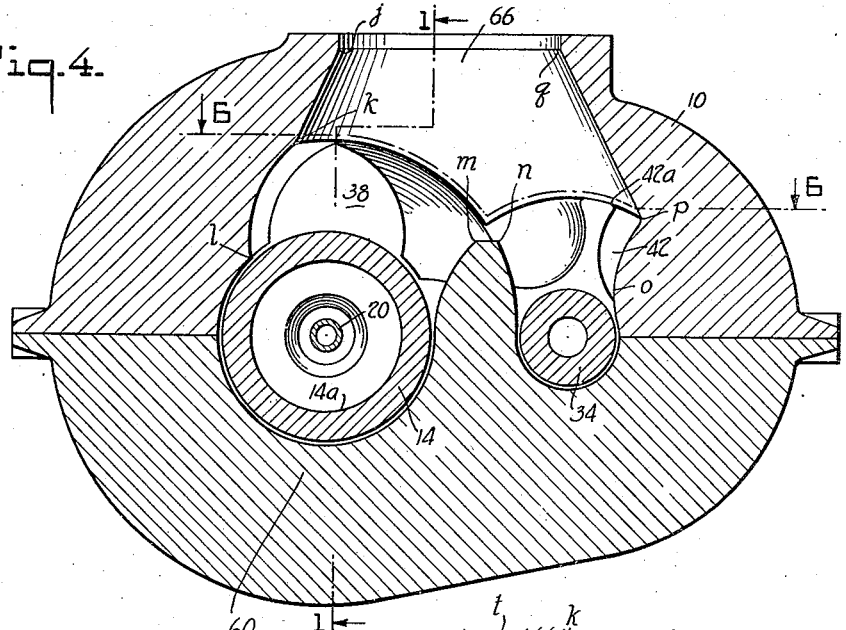
Fig. 4 is a section taken on the line 4—4 of Fig. 1.

The casing is provided with a partition 60 intermediate its ends which projects radially inwardly to fill the space 36 between the two sets of lobes on each rotor and to provide end wall surfaces 62 and 64 which define the outlet ends of the working chambers in certain positions of rotation of the rotors. This partition does not extend peripherally entirely around the rotors as will be more clearly seen from Fig. 4 in which the edge defining the peripheral extent of this partition is indicated by the line $j$—$k$—$l$—$m$—$n$—$o$—$p$—$q$. The outlet port is indicated generally at 66, this port being located in the casing intermediate its ends and as will be observed from Figs. 1 and 4, this port extends axially along each of the two sets of rotor lobes and is further in direct communication with the portion of the space 36 lying above the partition 60 so that the outlet port is in both radial and axial communication with the working spaces.

Figure 6:
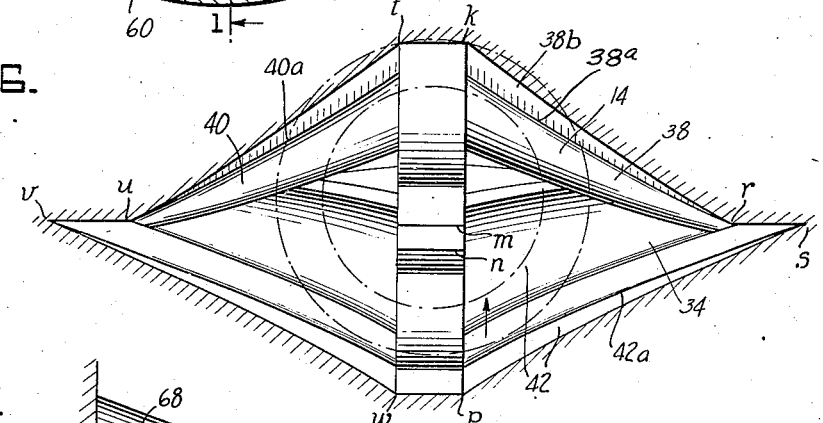
Fig. 6 is a fragmentary plan view looking from the line 6—6 of Figs. 1 and 4.

The nature of the portion of the port which is in radial communication with the working spaces is important in respect of one of the aspects of the present invention and in Fig. 6 the edges defining the radially communicating portions of the port are indicated by the lines $k$—$r$—$s$—$p$— and $t$—$u$—$v$—$w$, respectively.

As viewed in Fig. 6, the apex line of one of the male rotor lobes 38 appears at 38$a$ and that of one of the rotor lobes 40 appears at 40$a$. Likewise, 42$a$ (see also Fig. 4) indicates the edge of one of the female grooves 42. In the normal operation of the apparatus, the direction of movement of the rotor grooves and lobes will be as indicated by the arrows in Fig. 6 as they pass the outlet port and it will be noted that the port line $k$—$r$ is angularly related to the apex line 38$a$ of the male rotor and further that the line $s$—$p$ is angularly related to the line 42$a$ defining the edge of the female rotor groove. These port edges are so arranged that the portions of the port edges that are first passed by the apexes of the male rotor lobes and the edges of the female rotor grooves to open up communication between the working spaces and the outlet port, are adjacent to the outlet ends of the working spaces, and radial communication between the working spaces and the outlet port is opened up progressively as the rotors revolve, from the outlet ends of the working spaces axially toward their inlet ends, until full communication between the working spaces and the outlet port for radial discharge from such spaces is established. In the position of the rotors shown in Fig. 6, the port has been opened for radial discharge along the entire length of the port from the groove space 42 lying behind the edge 42$a$ and from the space 38$b$ lying behind the apex line 38$a$. Obviously the action is similar with respect to the port edges $t$—$u$ and $v$—$w$ which cooperate with the working spaces formed on the axially opposite side of the central partition 60.

In the operation of the hereinbefore described apparatus as a compressor, the working spaces are filled substantially axially of their length and progressively from the inlet toward the outlet ends thereof as the inlet ends of the spaces pass their respectively cooperating inlet port. Moreover, these spaces increase in volume to their maximum from their inlet toward their outlet as the rotors revolve during the portion of the cycle when the spaces are in communication with the inlet port, as will be more readily apparent from a consideration of Fig. 7 in which a working space 38$b$, lying between two apex lines 38$a$, and a female rotor working space 42, are shown in diagrammatic development.

The direction of rotation of the rotors as seen in this view is as indicated by the arrows 68. The lines defining the peripheral limits of the inlet port are indicated at $a$—$b$ and $e$—$f$, respectively, these lines corresponding to the similarly designated lines appearing in Fig. 3. At the opposite ends of the working spaces, the outlet end closing wall is indicated which corresponds to the portion of the partition 60 lying below the line $l$—$m$—$n$—$o$ in Fig. 4.

Figure 7:
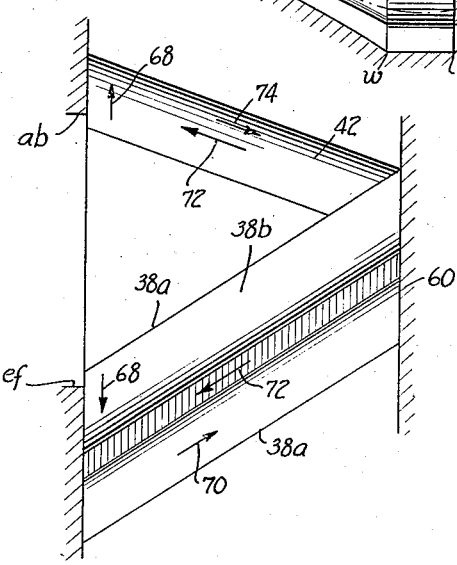
Fig. 7 is a diagrammatic development illustrative of certain features of construction.

As seen in Fig. 7, the working spaces open up progressively from left to right as the male rotor lobes progressively roll out of their cooperating grooves and the flow of air or other working fluid into these spaces is generally in the direction of the arrows 70. Because of the fact that the speed of rotation is relatively very high, a depressed pressure is created due to suction as the working spaces open up and this in turn induces a relatively high velocity of flow generally axially of the working spaces. As these spaces progressively open up to their full volume, the ends of the spaces are determined by the end wall at their outlet ends and this wall may be said to extend generally transversely of the axes of the spaces, although as will be observed from Fig. 7 the wall does not extend transversely at right angles to these axes. The high velocity column of fluid moving into the working spaces from the generally axially directed inlet produces what is in effect an elastic piston moving toward the outlet ends of the spaces and when the spaces open up to their full axial length, this moving column is stopped by the outlet end wall. Due, however, to the fact that the column is elastic, flow through the inlet port continues after flow has ceased at the outlet ends of the spaces. I have discovered that if the speed of operation of the rotors and the peripheral extent of the inlet port are properly related to the length of the working spaces, the volumetric efficiency of the apparatus may be enhanced by taking advantage of a phenomenon resulting from the impact of the high velocity fluid piston striking the outlet end wall as the spaces open up to their full length. When this occurs under high velocity conditions, a fluid pressure wave is created which moves in the working spaces back toward their inlet ends in the direction of the arrows 72. This pressure wave moves approximately with the velocity of sound and if the working spaces are kept in communication until approximately the time when this pressure wave reaches the inlet ends of the spaces, the net result is to produce what may conveniently be termed a ramming effect which enables the spaces to be filled with fluid at a pressure as high or higher than the pressure of the atmosphere or other fluid body from which the fluid entering the spaces is derived. As a consequence of this, a greater weight of fluid may be packed into the working spaces than corresponds to their actual volumetric displacement at inlet pressure and thus the capacity of a compressor of given size may be increased as compared with the capacity of a compressor which is not designed to make use of this ramming effect. The exact peripheral extent of the axially opening inlet required to achieve this desired result will be different with different specific compressor designs but in each instance, having in mind the substantially fixed speed of travel of the pressure wave created during the inlet period, the required peripheral extent of the inlet port is readily determinable for rotors having working spaces of given length and design to operate with a given normal peripheral speed. In all cases, however, if the desired effect is to be obtained, the peripheral extent of the inlet port must be such that the working space in the male rotor remains in communication with the inlet port until after such space has opened up to its full axial extent and full volume. By reference to Fig. 7 it will be seen that the working space 38b in the male rotor comes into communication at the outlet end with the working space formed by groove 42 in the female rotor before the male lobe has rolled completely out of the groove and thereby opened up the groove to its full volumetric capacity. Due to this open communication between the two spaces, the pressure wave created by impact against the end wall moves toward the inlet ends of both of the communicating spaces. Therefore, in order to secure the desired result it is not essential that the groove in the female rotor be kept in communication with the inlet port until after the groove in this rotor has reached its maximum volume. Also, it is desirable to so locate the lines $a$—$b$ and $e$—$f$ defining the peripheral limits of the inlet port that communication between the inlet port and the working spaces in both rotors is cut off simultaneously as indicated by the relative positions of these lines in Fig. 7 with respect to the edges of the working spaces formed in the rotors.

As hereinbefore noted, one of the requisites for obtaining an appreciable ramming effect is high velocity operation and by way of example, but without limitation it may be stated that the minimum peripheral velocity for the working spaces in order to achieve a ramming effect of sufficient magnitude to be of material practical importance is of the order of 150 feet per second. In an actual compressor embodying the above described feature of construction which I have built and tested, I have been able to secure an increase of as much as 12% in pressure above atmospheric in the working spaces due to ramming effect, by operating rotors approximately 12 inches long at peripheral velocities of approximately 285 feet per second and with the peripheral extent of the inlet port proportioned so that the working spaces remain in communication with the inlet port for approximately 20 degrees of angular travel of the male rotor after the position of the male rotor is reached at which the working space therein has attained its maximum volume.

In the operation of compressors of the kind under consideration, the working spaces, after they have opened up to their full volume and after they have passed out of communication with the inlet port are rotated through a certain amount of angular travel at constant volume. Thereafter, due to the entrance of a male rotor lobe into a cooperating female rotor groove and before the spaces come into communication with the outlet port, the volumes of the spaces are progressively decreased and this decrease is effected by the progressive shortening of the working spaces, due to the intermeshing lobes and grooves, from the inlet toward the outlet ends of the spaces. In connection with this action it may conveniently be said that the working spaces are axially displaced toward their outlet ends during the compression and discharge phases of the cycle. With the high speed of operation contemplated by the present invention, this axial displacement toward the outlet ends of the working spaces results in another phenomenon, advantage of which may be taken to improve the performance of the compressor by suitable design of the peripherally limiting edges of the outlet port, which when passed by the apexes of the male rotor lobes and the edges of the female rotor grooves determine the opening of communication between the working spaces and the outlet port. The axial displacement during the compression phase creates a pressure wave in the working spaces which travels toward the outlet end of the spaces and impacts against the wall defining the outlet ends of the spaces. This pressure wave operates to create a differential pressure within the working spaces themselves with a higher pressure at the outlet end than at the inlet end. This condition within the working spaces obtains at about the time when the spaces are brought into communication with the outlet port in the normal operation of the apparatus and in order to secure more efficient operation of the apparatus with less throttling loss at the outlet port, I have found that it is, due to this phenomenon, advantageous to open communication between the outlet port and the working spaces progressively from the outlet toward the inlet ends of the latter. It is for this reason that in accordance with this phase of my invention I provide an outlet port with limiting edges such as $k$—$r$ and $s$—$p$ of Fig. 6, the pitch of which is greater than the pitch of the rotor lobes and grooves which respectively cooperate therewith. By reference to Fig. 6 it will readily be seen that with the rotors turning in the directions indicated by the arrows therein, the working spaces will open progressively into communication with the outlet port from their outlet ends toward their inlet ends until communication over the full axial length of the port is established.

In the embodiment of apparatus herein shown and described, the two sets of working spaces are separated by an intermediate partition wall 60 the purpose of which is to provide for both axial and radial discharge from the working spaces in order to reduce throttling losses and in this connection it is to be noted that the lines $k-l$ and $o-p$ (Fig. 4), which define the peripheral extent of the portion of the outlet port which communicates with the axial ends of the working spaces are located with reference to the lines $k-r$ and $s-p$ which define the peripheral extent of the portion of the port which communicates radially with the working spaces, so that the working spaces are opened for axial communication with the outlet port simultaneously with the time when the port begins to progressively come into communication with the spaces in radial direction. Thus, the point $k$ of Fig. 6 corresponds with point $k$ of Fig. 4 and point $p$ of Fig. 6 corresponds with point $p$ of Fig. 4.

It will be apparent that in so far as the features of the invention involving ramming and exhaust port configuration are concerned, such features are equally applicable to single as well as double ended compressors and it will further be apparent that without departing from the scope of the invention, many changes in specific design may be made and certain features of the invention used to the exclusion of others. It is accordingly to be understood that the invention embraces all forms and modifications of apparatus falling within the scope of the appended claims.

What is claimed:

1. In a rotary screw wheel compressor of the kind having intermeshing spiral lobed and grooved rotors rotating in a casing structure between inlet and outlet casing end walls and in which working spaces open up from the inlet ends to the outlet ends of the grooves during the inlet phase of the cycle of operation, inlet port means in the inlet end wall for directing fluid into said grooves in generally axial direction during said inlet phase, whereby to create columns of said fluid flowing generally longitudinally of said grooves during said inlet phase and impacting the outlet end wall as the grooves open up to their maximum volume, the peripheral extent of said inlet port means causing the same to remain in direct axial communication with at least certain of said grooves for a substantial period after such grooves have come into full communication with said outlet end wall, whereby to create a ramming effect in such grooves due to said impacting.

2. In a rotary screw wheel compressor of the kind having intermeshing male and female spiral lobed and grooved rotors rotating in a casing structure between inlet and outlet casing end walls and in which working spaces open up from the inlet ends to the outlet ends of the grooves during the inlet phase of the cycle of operation, inlet port means in the inlet end wall for directing fluid into said grooves in generally axial direction during said inlet phase, whereby to create columns of said fluid flowing generally longitudinally of said grooves during said inlet phase and impacting the outlet end wall as the grooves open up to their maximum volume, the peripheral extent of said inlet port means causing the same to remain in direct axial communication with the grooves of said male rotor for a substantial period after such grooves have come into full communication with said outlet end wall, whereby to create a ramming effect in such grooves due to said impacting.

3. In a rotary screw wheel compressor of the kind having intermeshing spiral lobed and grooved rotors rotating in a casing structure between inlet and outlet casing end walls and in which working spaces open up from the inlet ends to the outlet ends of the grooves during the inlet phase of the cycle of operation, inlet port means in the inlet end wall for directing fluid into said grooves in generally axial direction during said inlet phase, means for driving said rotors at a normal operating speed providing a peripheral velocity of said working spaces within a range the lower limit of which is of the order of 150 ft. per second, whereby to create high velocity columns of said fluid flowing generally longitudinally of said grooves during said inlet phase and impacting the outlet end wall as the grooves open up to their maximum volume, the peripheral extent of said inlet port means causing the same to remain in direct axial communication with at least certain of said grooves for a substantial period after such grooves have come into full communication with said outlet end wall, whereby to create a ramming effect in such grooves due to said impacting.

4. In a rotary screw wheel compressor of the kind having intermeshing male and female spiral lobed and grooved rotors rotating in a casing structure between inlet and outlet casing end walls and in which working spaces open up from the inlet ends to the outlet ends of the grooves during the inlet phase of the cycle of operation, inlet port means in the inlet end wall for directing fluid into said grooves in generally axial direction during said inlet phase, means for driving said rotors at a normal operating speed providing a peripheral velocity of said working spaces within a range the lower limit of which is of the order of 150 ft. per second, whereby to create high velocity columns of said fluid flowing generally longitudinally of said grooves during said inlet phase and impacting the outlet end wall as the grooves open up to their maximum volume, the peripheral extent of said inlet port means causing the same to remain in direct axial communication with the grooves of said male rotor for a substantial period after such grooves have come into full communication with said outlet end wall, whereby to create a ramming effect in such grooves due to said impacting.

5. In a rotary screw wheel compressor of the kind having intermeshing spiral lobed and grooved rotors rotating in a casing structure between inlet and outlet casing end walls and in which working spaces open up from the inlet ends to the outlet ends of the grooves during the inlet phase of the cycle of operation, inlet port means in the inlet end wall for directing fluid into said grooves in generally axial direction during said inlet phase, whereby to create columns of said fluid flowing generally longitudinally of said grooves during said inlet phase and impacting the outlet end wall as the grooves open up to their maximum volume, said inlet port means including a closing edge for cutting off communication between said inlet port means and the grooves in one of said rotors, and the peripheral location of said closing edge being related to the length and to the normal speed of operation of the grooves controlled thereby to cut off direct axial communication between the grooves and the inlet port only after an interval following the time when the grooves controlled thereby have opened up to their maximum volume but before the pressure wave created in said fluid by said impacting can travel from the outlet ends to the inlet ends of the grooves controlled by said closing edge.

6. In a rotary screw wheel compressor of the kind having intermeshing male and female spiral lobed and grooved rotors rotating in a casing structure between inlet and outlet casing end walls and in which working spaces open up from the inlet ends to the outlet ends of the grooves during the inlet phase of the cycle of operation, inlet port means in the inlet end wall for directing fluid into said grooves in generally axial direction during said inlet phase, whereby to create columns of said fluid flowing generally longitudinally of said grooves during said inlet phase and impacting the outlet end wall as the grooves open up to their maximum volume, said inlet port means including a closing edge for cutting off communication between said inlet port means and the grooves in said male rotor, and the peripheral location of said closing edge being related to the length and to the normal speed of operation of the grooves controlled thereby to cut off direct axial communication between the grooves and the inlet port only after an interval following the time when the grooves controlled thereby have opened up to their maximum volume but before the pressure wave created in said fluid by said impacting can travel from the outlet ends to the inlet ends of the grooves controlled by said closing edge.

7. In a rotary screw wheel compressor, casing structure having an inlet port for fluid, a plurality of intermeshing spiral lobed and grooved rotors cooperating with each other and the casing structure to form compression spaces defined at one end by a wall forming a part of said casing structure, said spaces decreasing in volume toward said wall as the rotors revolve, and an outlet port in said casing structure extending axially from said wall and arranged to be brought into radial communication with said spaces by the rotation of said rotors, said outlet port having limiting edges shaped to open radial communication between the outlet port and the portions of the compression spaces adjacent to said wall before radial communication between the outlet port and the portions of the respective spaces remote from said wall is established.

8. In a rotary screw wheel compressor, casing structure having an inlet port for fluid, a plurality of intermeshing spiral lobed and grooved rotors cooperating with each other and the casing structure to form compression spaces defined at one end by a wall forming a part of said casing structure, said spaces decreasing in volume toward said wall as the rotors revolve, and an outlet port in said casing structure extending axially from said wall and arranged to be brought into radial communication with said spaces by the rotation of said rotors, said outlet port having limiting edges located to progressively open radial communication between the outlet port and said spaces in a direction away from the wall.

9. In a rotary screw wheel compressor, casing structure having an inlet port for fluid, a plurality of intermeshing spiral lobed and grooved rotors cooperating with each other and the casing structure to form compression spaces defined at one end by a wall forming a part of said casing structure, said spaces decreasing in volume toward said wall as the rotors revolve, and an outlet port in said casing structure extending axially from said wall and arranged to be brought into radial communication with said spaces by the rotation of said rotors, said outlet port having limiting edges located to be passed by the edges of the rotor lobes and grooves, said limiting edges being inclined toward each other in the direction away from said wall and the inclination of said edges being greater than the pitch angles of the rotor edges with which they respectively cooperate.

10. In a rotary screw wheel compressor, casing structure having an inlet port for fluid, a plurality of intermeshing spiral lobed and grooved rotors cooperating with each other and the casing structure to form compression spaces defined at one end by a wall forming a part of said casing structure, said spaces decreasing in volume toward said wall as the rotors revolve, and an outlet port in said casing structure, said outlet port having portions located to communicate axially and radially respectively with said spaces, the radially communicating portion having limiting edges located to provide progressive communication between the spaces and the wall in a direction away from the outlet port and the axially communicating portion having limiting edges located to provide communication between the outlet port and the spaces substantially simultaneously with the commencement of the progressive radial communication.

ALF LYSHOLM.